INVENTORS
Ernest E. Pittelli &
Wilhelm Rindner

ATTORNEYS

United States Patent Office 3,537,305
Patented Nov. 3, 1970

3,537,305
TRANSVERSE PIEZORESISTANCE AND PINCH EFFECT ELECTROMECHANICAL TRANSDUCERS
Wilhelm Rindner, Lexington, and Ernest E. Pittelli, Harvard, Mass., assignors to the United States of America as represented by the Administrator of the National Aeronautics and Space Administration
Filed Sept. 19, 1968, Ser. No. 760,927
Int. Cl. G01l 1/18
U.S. Cl. 73—141
13 Claims

ABSTRACT OF THE DISCLOSURE

Solid state force measuring electromechanical transducers formed of piezoresistive materials. The main crystallographic axis of the piezoresistive material forming the device is "off" or skewed with respect to the axis of the force to be measured. In addition, transverse surfaces (parallel to the force axis) may be doped so as to have high and low recombination velocities thereby enhancing the pinch effect to make the transducer more force sensitive. The force to be sensed and a bias voltage are both applied along the same axis and generate on the transverse surfaces a voltage that is sensed by a suitable voltage sensing means. The magnitude of the change in the transverse voltage is related to the magnitude of the applied force.

The invention described herein was made by employees of the United States Government and may be manufactured and used by or for the Government for governmental purposes without the payment of any royalties thereon or therefor.

BACKGROUND OF THE INVENTION

The use of force measuring electromechanical transducers to measure forces on various mechanical structures is widespread. Many prior art force measuring transducers are temperature sensitive. Because of this temperature sensitivity, a plurality of these devices have been mounted in a bridge circuit to provide automatic temperature compensation. Because more than one transducer is required, the expense of the overall transducer network is increased over the cost of a single transducer network. In addition, it is difficult to obtain transducers that have exactly the same temperature characteristic. Hence, even mounting a plurality of transducers in a bridge configuration does not completely eliminate errors due to temperature variations. Moreover, prior art bridge transducers are not sensitive enough to be used in some environments.

More recently, transverse piezoresistive electromechanical transducers have been developed. An example of such a transducer is described in U.S. Pat. 3,145,563 to Hollander, Jr. Prior art piezoresistive electromechanical transducers of the type described in the Hollander, Jr. patent depend upon the shear characteristics of a piezoresistive material. That is, shear force applied along one of the axes of the piezoresistive material creates a shear stress which generates a voltage. The voltage is related to the force, hence, an appropriate voltage sensing means provides an indication of the force. While some of these devices are temperature independent and, hence, do not have to be mounted in a bridge, they are not entirely suitable for use in all environments. Specifically, these devices cannot sense compressive or tensile forces if a shear strain is not created; that is, no voltage indication of the force applied is generated. Hence, prior art transverse piezoresistive electromechanical transducers are not capable of performing in many environments.

Therefore, it is an object of this invention to provide new and improved electromechanical transducers.

It is also an object of this invention to provide new and improved electromechanical transducers with a temperature independent null.

It is yet another object of this invention to provide new and improved electromechanical transducers of a solid state nature that do not have to be mounted in a bridge circuit to provide temperature compensation for a null.

It is a still further object of this invention to provide new and improved electromechanical transducers that can measure forces over a wide range including forces that do not create a shear strain in a piezoresistive transducer.

It is yet another object of this invention to provide a piezoresistive electromechanical transducer that does not depend upon a shear stress for the generation of indicating voltages when a force is applied to the transducer.

SUMMARY OF THE INVENTION

In accordance with a principle of this invention a new and improved force sensing electromechanical transducer formed of a body of a homogenous, piezoresistive material is provided. The main crystallographic axis of the material is skewed with respect to the axis of the force to be sensed. A bias voltage is applied along the force axis of the material and sensing electrodes are mounted on surfaces that are parallel to the force axis. Hence, the axis of the electrodes is transverse to the force axis. When a force is applied along the force axis, a voltage change is generated across the electrodes. The voltage change is proportional to the applied force.

In accordance with a further principle of the invention, if both transverse surfaces have large recombination velocities, the main voltage change created across the transverse terminals by non-shear stress is a piezoresistive voltage.

In accordance with yet another principle of the invention, the piezoresistive material is formed so that one of the transverse electrode surfaces has an extremely high recombination velocity while the other surface has an extremely low recombination velocity. Then, the voltage change created across the transverse electrodes is primarily a pinch effect voltage as opposed to a piezoresistive voltage.

In accordance with a further principle of this invention, various piezoresistive structures between the two extremes set forth in the preceding two paragraphs are provided. These piezoresistive structures combine piezoresistive and pinch effects to create the sensed voltage change.

It will be appreciated from the foregoing description of the invention that a new and improved piezoresistive and/or pinch effect transducer is provided. In one embodiment, the invention depends upon the piezoresistive effect of the material and in another, it depends upon the pinch effect of the material. The former provides smaller output voltages in response to a given force signal while the latter provides much larger output voltages. In between the two extremes are a large number of transducer structures. In addition to the advantage of measuring large and small forces over a wide range, the invention has the additional advantage of having a temperature independent null. That is, variations in ambient temperature do not vary the zero stress signal output voltage.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS

Figure 1:
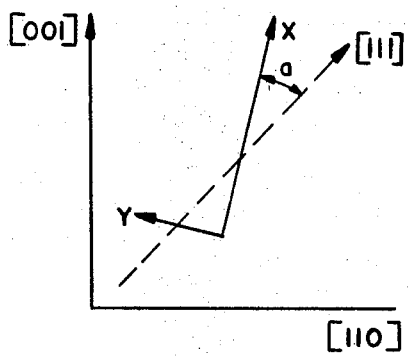
FIG. 1 is a graph illustrating the crystallographic orientation of the material with respect to the plane of the force axis.

Prior to discussing the actual embodiments of the invention, the following discussion of electrical pinch effect in intrinsic semiconductor materials is provided.

Consider an infinite instrinsic anisotropic semiconductor with electron and hole conductivity tensors $$\underset{\approx}{\sigma}_n \text{ and } \underset{\approx}{\sigma}_p$$

possessing off-diagonal elements $\sigma_{xy}$ so that an electric field in the $x$-direction will produce currents in both the $x$ and $y$ directions.

$$J_x = \sigma_{xx} E_x \quad (1)$$
$$J_y = \sigma_{yx} E_x \quad (2)$$

For a specimen of slap geometry with thickness $$2d \, (-d \leq y \leq d)$$

and an applied electric field $E_x$, the requirement of zero current in the transverse $y$-direction leads to a field $E_y$ given by $$J_y = 0 = \sigma_{yx} E_x + \sigma_{yy} E_y \quad (3)$$

so that the transverse field $E_y$ is given by $$E_y = -\sigma_{yx} E_x / \sigma_{yy} \quad (4)$$

However, if $\sigma_{nxy}$ and $\sigma_{pyx}$, the conductivity elements for electrons and holes respectively, are not equal, the individual electron and hole currents $j_{ny}$ and $j_{py}$ cannot vanish separately and concentration gradients $\partial n/\partial y$ and $\partial p/\partial y$ will arise in the $y$-direction. Evidently, the quantities $n$, $p$, $E_y$, and $j_x$ depend only on $y$. Also, since $$\nabla x E = 0 = \frac{-\partial E_x}{\partial y} \quad (5)$$

$E_x$ must be constant.

In the $x$-direction, the hole and electron currents may be written $$j_{px} = e\mu_{pxx} p E_x + e\mu_{pyx} p E_y - e D_{pyx} \frac{\partial p}{\partial y} \quad (6)$$

$$j_{nx} = en(\mu_{nxx} E_x + \mu_{nyx} E_y) + e D_{nyx} \frac{\partial p}{\partial y} \quad (7)$$

where $\underset{\approx}{\mu}$ is the mobility tensor and $\underset{\approx}{D} = kT \underset{\approx}{\mu}/e$ is the diffusivity tensor. The concentration gradient in the $y$-direction, $\partial p/\partial y$, and the field $E_y$ thus contribute to the current $j_{nx}$ and $j_{px}$. In (6) and (7) it is assumed that the sample is quasi-neutral so that $\Delta n \simeq \Delta p$. Since $$E_y = \frac{-\sigma_{yx} E_y}{\sigma_{xx}} = -\left(\frac{\mu_{nyx} + \mu_{pyx}}{\mu_{nyy} + \mu_{pyy}}\right) E_x \quad (8)$$

the total current in the $x$-direction may be written $$j_x = j_{nx} + j_{px} = \sigma_{xx} E_x + \sigma_{yx}\left(\frac{-\sigma_{yx}}{\sigma_{yy}}\right) E_x + \frac{e \partial p}{\partial y}(D_{nyx} - D_{pyx}) \quad (9)$$

or $$j_x = \left(\sigma_{xx} - \frac{\sigma^2_{yx}}{\sigma_{yy}}\right) E_x + kT \frac{\partial p}{\partial y}(\mu_{nyx} - \mu_{pyx}) \quad (10)$$

$$= e\mu^* p E_x + kT \frac{\partial p}{\partial y}(\mu_{nyx} - \mu_{pyx}) \quad (11)$$

where $\mu^* = \frac{1}{ep}\left(\frac{\sigma_{xx}\sigma_{yy} - \sigma^2_{xy}}{\sigma_{yy}}\right) = \frac{\mu_{xx}\mu_{yy} - \mu^2_{xy}}{\mu_{yy}} \quad (12)$ is independent of carrier concentration.

The carrier conecentration is given by the equation of continuity $$\frac{\partial p}{\partial t} = -\frac{p - p_0}{\tau} - \frac{1}{e} \nabla \cdot j_p \quad (13)$$

where $\tau$ is hole lifetime and $$\nabla \cdot j_p = \nabla \cdot j_{py} \quad (14)$$

$$j_{py} = -e \frac{\partial p}{\partial y} D_{pyy} + p e E_x (\mu_{pyx} - \mu_{nyx}) \quad (15)$$

appropriately combining the foregoing equations results in $$\frac{\partial p}{\partial t} = -\left(\frac{p - p_0}{\tau} + D \frac{\partial^2 p}{\partial y^2}\right) + \left(\frac{\mu_{nyx} - \mu_{pyx}}{2}\right)\frac{\partial p}{\partial y} E_x \quad (16)$$

$$j_x = ep E_x \mu^* + e \frac{\partial p}{\partial y}(D_{nyx} - D_{pyx}) \quad (17)$$

$$j_{py} = -e \frac{\partial p}{\partial y} D_{pyy} + \frac{p e E_x}{2}(\mu_{pyx} - \mu_{nyx}) \quad (18)$$

To simplify the equations, it has been assumed $$\mu_{pxx} = \mu_{nxx} = \mu_{pyy} = \mu_{nyy}$$

however, the results are not significantly changed if this equality does not hold.

Equations 16, 17, 18 have the following physical meaning: In an anisotropic semiconductor the field $E_x$ must give rise to an electric field $E_y$ because no current $j_y$ can flow. The field $E_y$, in turn, contributes to the current $j_x$. Moreover, if there exists a concentration gradient $\partial p/\partial y$ in the $y$-direction, there is a diffusive contribution to the current $j_x$ because of the off-diagonal elements in the diffusivity tensor. From Equation 17 the total current $J_x$ is given by $$J_x = \int_{-d}^{+d} j_x(y) dy = e\mu^* E_x \int p(y) dy + e(D_{nyx} - D_{pyx})[p(d) - p(-d)] \quad (19)$$

The spatial distribution of carriers is then given by Equation 18 with the boundary conditions at $y = \pm d$ determined by $j_{py}$ and the surface recombination velocities. For surface recombination velocities $$\begin{matrix} s_2 \\ s_1 \end{matrix} \text{ at } y = \pm d$$

the following equations result $$j_{py}]\pm d = -eD \frac{\partial p}{\partial y} + p e E_x (\mu_{pyx} - \mu_{nyx})]\pm d \quad (20)$$

$$= \pm e \begin{matrix} s_2 \\ s_1 \end{matrix} \Delta p]\pm d \quad (21)$$

If a solution of the form $$\frac{p(y) - p_i}{p_i} = A e^{\frac{x_1 y}{L}} + B e^{\frac{x_2 y}{L}} \quad (22)$$

is assumed, the boundary condition with the original continuity equation then give $$\gamma_{1,2} = -\gamma \pm \sqrt{1+\gamma^2} \gamma = \frac{a}{4} \frac{eL}{kT} E_x$$

$$a = \frac{\mu_{nxy} - \mu_{pxy}}{\mu_{yy}} \quad (23)$$

$$A = \frac{\gamma}{\xi(\gamma)} \left\{ \left[ (s_1 - s_2) \frac{L}{D} + 2\alpha_1 \right] \sinh \frac{\alpha_2 d}{L} - (s_1 + s_2) \frac{L}{D} \cosh \frac{\alpha_2 d}{L} \right\} \quad (24)$$

$$B = \frac{\gamma}{\xi(\gamma)} \left[ (s_2 - s_1) \frac{L}{D} - 2\alpha_2 \right] \sinh \frac{\alpha_1 d}{L} + (s_1 + s_2) \frac{L}{D} \cosh \frac{\alpha_1 d}{L} \quad (25)$$

$$\xi(\gamma) = \left[ 1 + \frac{s_1 s_2 L^2}{D^2} + \frac{\gamma L}{D}(s_1 - s_2) \right] \sinh\left( \frac{2d}{L} \sqrt{1+\gamma^2} \right) + \sqrt{1+\gamma^2} (s_1 + s_2) \frac{L}{D} \cosh\left( \frac{2d}{L} \sqrt{1+\gamma^2} \right) \quad (26)$$

The main result of Equations 19 and 22 is that the current $j_x$ depends not only on $E_x$ but also on the off-diagonal mobility elements $\mu_{nyx}$ and $\mu_{pyx}$ and the free carrier concentration $p(y)$. As hereinafter described, the former depend on the applied stress and sample orientation; the latter depend on surface recombination velocities as well as applied stress and sample orientation.

Turning now to a discussion of stress induced pinch effect, consider a rectangular sample with axes $x$, $y$, $z$, which do not coincide with crystals $x'$, $y'$, $z'$.

If $(l_1 m_1 n_1)$, $(l_2 m_2 n_2)$, and $(l_3 m_3 n_3)$ are the direction cosines of the sample axes $o_x$, $o_y$, $o_z$ with respect to the primed crystal axes, then $$\begin{pmatrix} x \\ y \\ z \end{pmatrix} = \begin{pmatrix} l_1 m_1 n_1 \\ l_2 m_2 n_2 \\ l_3 m_3 n_3 \end{pmatrix} \begin{pmatrix} x' \\ y' \\ z' \end{pmatrix} \quad (27)$$

or, in matrix notation $$\underset{\sim}{x} = \underset{\approx}{A} \underset{\sim}{x'} \quad (28)$$

In terms of the piezoresistance tensor $\underset{\approx}{\pi}$ and the stress tensor $\underset{\approx}{K}$, the piezoresistance $\delta \rho / \rho_i$ may be written $$\frac{\delta \rho_{ij}^{n,p}}{\rho_i} = \sum_{k,l} \pi_{ijkl}^{n,p} K_{kl} \quad (29)$$

for stress along the $x$-axis $$\frac{\delta \rho_{12}}{\rho_i} = \frac{\delta \rho xy}{\rho_i} = \pi_{12\,11} K_{11} \quad (30)$$

Where $\pi_{12\,11}$ is in the sample coordinate system. If the piezoresistivity tensor is transferred to the crystal coordinate system by means of a similarity transformation then $$\frac{\delta \rho_{12}}{\rho_i} = \sum_{p,q,m,n} A_{lm}^{-1} \pi_{m,n,p,q} A_{pl} K_{11} A_{lq}^{-1} A_{n2} \quad (31)$$

For a cubic material the tensor $\underset{\approx}{\pi'}$ can be resolved into three elements, hence, from (27) and (31).

$$\frac{\delta \rho_{12}}{\rho_i} = (\pi'_{11} - \pi'_{12} - \pi'_{44})(l_1^3 l_2 + m_1^3 m_2 + n_1^3 n_2) K_{11} \quad (32)$$

The extreme value of the second bracket in Equation 32 is $\pm 0.281$ and corresponds to the following orientation.

$$\begin{pmatrix} l_1 m_1 n_1 \\ l_2 m_2 n_2 \\ l_3 m_3 n_3 \end{pmatrix} = \begin{pmatrix} 0.305 & 0.305 & 0.902 \\ -0.638 & -0.638 & 0.432 \\ 0.707 & -0.707 & 0.0 \end{pmatrix} \quad (33)$$

Since $\delta \rho_{ij}/\rho_i \equiv \sigma_{ij}/\sigma_i$, the coefficient $a$ in Equation 23 may then be written $$a = -\left( \frac{\delta \rho_{xy}^n}{\rho_i} - \frac{\delta \rho_{xy}^p}{\rho_i} \right) \quad (34)$$

$$= 0.281 [(\pi'_{11} - \pi'_{12} - \pi'_{44})^p - (\pi'_{11} - \pi'_{12} - \pi'_{44})^n] K_{11} \quad (35)$$

In germanium and silicon $$a_{Ge} = 0.67 \times 10^{-4} (\text{cm.}^2/\text{kg.}) K_{11} \quad (36)$$

$$a_{Si} = -0.034 \times 10^{-4} (\text{cm.}^2/\text{kg.}) K_{11} \quad (37)$$

and from Equation 32

$$\frac{\delta \sigma_{xy}}{\sigma_i} Ge = 0.15 \times 10^{-4} \, (\text{cm.}^2/\text{Kg.}) \, K_{11} \quad (38)$$

$$\frac{\delta \sigma_{xy}}{\sigma_i} Si = -0.72 \times 10^{-4} \, (\text{cm.}^2/\text{Kg.}) \, K_{11} \quad (39)$$

Although the anisotropy of $\sigma_{xy}$ is only about 1% for $K_{11} = 10^3$ kg./cm.$^2$, the concentration $p(y)$ depends only on the combination $\gamma \sim aLE_x$ where the smallness of $a$ is compensated by a large $L$. The pinch effect is therefore caused primarily by the large stress-induced concentration gradient of carriers rather than by the stress-induced off-diagonal conductivity elements. This results in a current change one to two orders of magnitude greater than ordinary piezoresistance for a stress of $10^3$ kg./cm.$^2$ Turning now to a brief discussion of transverse pinch effect, the total current in the transverse $y$-direction may be written $$j_y = e(D_{nyy} - D_{pyy}) \frac{\partial p}{\partial y} + \sigma_y E_x - \sigma_{yy} \frac{\partial V}{\partial y} \quad (40)$$

The potential drop between transverse surfaces may be obtained by integration of Equation 40

$$V_{+d} - V_{-d} \equiv \Delta V = \left( \frac{D_{nyy} - D_{pyy}}{\mu_{nyy} + \mu_{pyy}} \right) \ln \frac{p(d)}{p(-d)} + 2d \frac{\sigma_{yx}}{\sigma_{yy}} E_x \quad (41)$$

For the case of both surfaces having recombination velocities equal to or greater than $10^2$ cm./sec., the first term in Equation 41 is one order of magnitude smaller than the second. Thus, a transverse voltage is induced which depends on the stress, the electric field $E_x$, the thickness of the sample, the combination of piezoresistive coefficients given in Equation 32 and the sample orientation. From Equations 39 and 40, the transverse voltage is around 7 volts for a cubic silicon sample with a field $E_x = 50$ v./cm. and a stress of $10^9$ dynes/cm.$^2$.

If one or both surfaces exhibits a recombination velocity somewhat smaller than $10^2$ cm./sec., the first term in Equation 41 dominates and the "transverse pinch effect," analogous to the ordinary pinch effect, may be observed with all the advantages of a balanced output device independent of bias condition or temperature.

From the foregoing discussion of piezoresistive and pinch effects in semiconductor materials, it will be appreciated that these two effects can be combined to form a novel force sensing transducer. If the transducer is formed so as to make piezoresistance the predominant effect, the force sensing transducer is adapted to sense large forces as compared to a device wherein pinch effect is the predominant effect. That is, a pinch effect transducer is adapted to sense smaller forces than is a piezoresistive transducer.

Turning now to the drawings for a more specific discussion of actual embodiments of the invention, FIG. 1 illustrates schematically the stress and electric field orientation giving rise to one type of pinch effect. More specifically, FIG. 1 illustrates schematically the stress and electric field orientation giving rise to a longitudinal pinch effect in a particular (X–Y) plane. The [111] arrow illustrates the crystallographic axis of the body of semiconductor material in the X–Y plane as that plane is depicted in FIG. 2.

Figure 2:
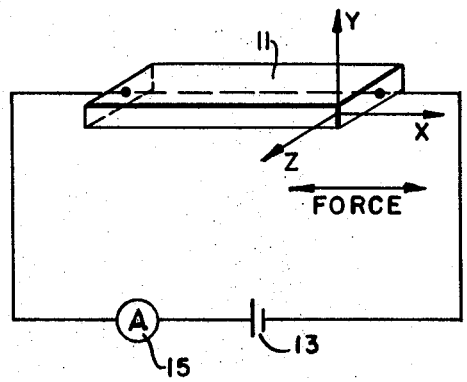
FIG. 2 is a schematic diagram illustrating a circuit for generating and measuring longitudinal pinch effect voltages.

FIG. 2 is a schematic diagram illustrating a circuit for generating and measuring longitudinal pinch effect in a semiconductor body having a crystallographic orientation in the X–Y plane of the type illustrated in FIG. 1. As mathematically discussed above, for an orientation of the type illustrated in FIG. 1, the anisotropy of the piezoresistance for holes and electron gives rise to a pressure-induced excess concentration of free carriers confined mainly to one of the surfaces transverse to the stress and the electric field when the stress and the electric field are applied in the manner illustrated in FIG. 2. Specifically, FIG. 2 includes a body of semiconductor piezoresistive material 11 having a longitudinal axis in the X-direction as depicted by the X arrow. A voltage source 13 is connected in series with an ammeter 15 so as to apply a voltage gradient along the X-axis. Force is applied in either compression or tension as depicted by the axis of the force arrow which is parallel to the X-axis.

Figure 3:
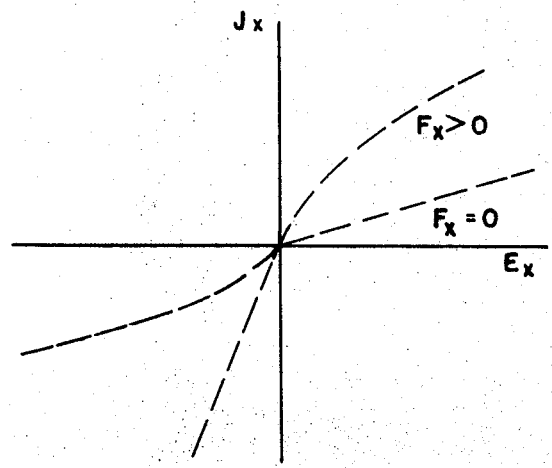
FIG. 3 is a graph of longitudinal pinch effect current vs. electric field voltage for a piezoelectric material having a skewed crystallographic orientation with respect to the force axis.

If the semiconductor material is homogenous and the concentrations of free carriers on each surface are equal, the longitudinal pinch effect variation created by the force is independent of bias polarity and temperature. However, the resistance change resulting from the concentration gradient of free carriers in the transverse directions can be enhanced if the two transverse surfaces are processed so as to present extremes of high and low recombination velocity, respectively. If such unequal surfaces are created, the longitudinal pinch effect becomes dependent on bias polarity. That is, as illustrated in FIG. 3, the sensed current has a direction that is determined by the polarity of the applied voltage, and the current-voltage relationship varies in accordance with the direction of current flow.

It should be noted that the longitudinal pinch effect measured by the circuit illustrated in FIG. 2 actually comprises two components. These components are the conventional piezoresistance effect (but not in the conventional longitudinal manifestation) and a diffusion effect. These two effects can aid or oppose each other. With low life time and resistivity materials and high recombination surfaces, the dominant component is piezoresistance; whereas with higher resistivity and lifetime and low recombination surfaces, the dominant component is longitudinal pinch effect. In between these two extremes, there is a whole spectrum of effects involving varying degrees of both effects. Hence, special transducers for use in special circumstances can be developed in accordance with the invention. Special circumstances will generally be dependent upon the amount of force to be sensed. Clearly, transducers of the type illustrated in FIG. 2 have application in force measuring environments. However, these transducers will have shortcomings because of their non-linear output and for other similar reasons. To overcome these problems this invention provides means for sensing transverse pinch effect.

Figure 4:
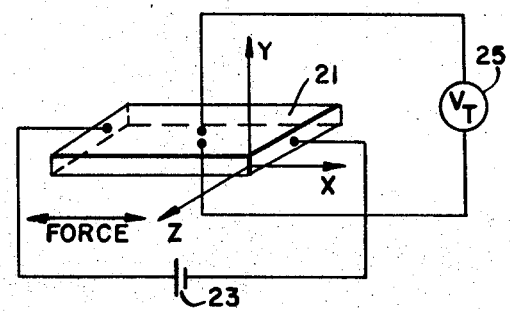
FIG. 4 is a schematic diagram illustrating an apparatus for measuring transverse pinch effect voltages and forms one embodiment of the invention.

FIG. 4 illustrates an apparatus for measuring transverse pinch effect and forms one embodiment of the invention. The apparatus illustrated in FIG. 4 comprises a body of semiconductor material 21 having a longitudinal axis in the X-direction. Connected across the longitudinal axis is a bias voltage source 23. Connected across surfaces transverse to the longitudinal axis is a voltmeter 25. Force is applied along the longitudinal axis as illustrated by the force arrow. When force and a bias voltage are applied, a transverse voltage is generated in accordance with the theory heretofore discussed. That is, when the body of semiconductor material is in a quiescent state, a deflection of current flow toward one side of the sample attempts to occur. But because the device is in equilibrium, no transverse current can flow; hence, a transverse voltage must exist to maintain the equilibrium. Thus, the transverse contacts, if appropriately positioned opposite each other, show no voltage unless longitudinal bias and pressure are applied. For increasing pressure, the voltage increases as long as the load impedance is large when compared with the transverse impedance of the body of material, a condition that is easily satisfied. Different outputs are obtained depending upon the bias source impedance and on the bias polarity.

The advantages of the transverse pinch effect transducer compared with just a longitudinal pinch effect transducer are manifold. Specifically, a transverse pinch effect transducer yields a balanced device output that is independent of bias conditions and/or temperature. A transverse pinch effect transducer is also largely independent of contact resistance and contact stability.

Figure 5:
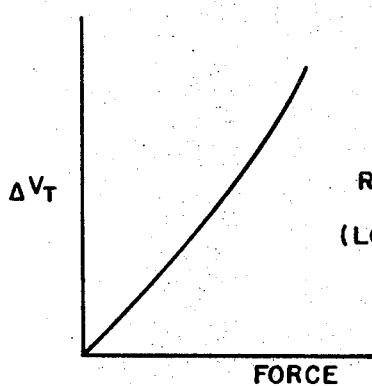
FIG. 5 is a graph illustrating the change in voltage or applied force for a circuit of the type illustrated in FIG. 4.

FIG. 5 is a change in voltage vs. force diagram illustrating the change in voltage output for applied force to a device of the type illustrated in FIG. 4. It will be noted that the relationship is near linear; hence, the output from the transducer is easily interpreted by a suitable sensing means, such as the voltmeter 25, for example.

Figure 6:
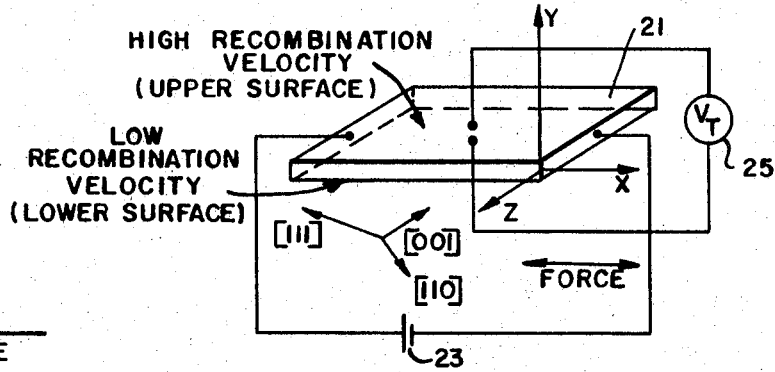
FIG. 6 is a schematic diagram of an alternative embodiment of the invention.

FIG. 6 is generally similar to FIG. 4 except that the upper surface of the body of semiconductor material attached to one of the transverse contacts has a high recombination velocity whereas the lower surface attached to the other of the transverse contacts has a low recombination velocity. If FIG. 4 illustrates the extreme of a homogenous anisotropic semiconductor material wherein piezoresistance is the primary effect causing the transverse sensed voltage, then FIG. 6 is an illustration of the opposite extreme. That is, FIG. 6 is generally similar to FIG. 4 and illustrates the extreme where pinch effect is the predominant factor creating the transverse voltage. Between the two extremes illustrated in FIGS. 4 and 6 are manifold transducers that combine the two extreme effects.

The sensitivity of transducers of the type herein described far exceed conventional semiconductor strain gauges, yet, transverse pinch effect transducers are bulk effect devices using conventional piezoresistance semiconductor materials (such as germanium or silicon, for example). Hence, no particular fabrication problems are created. There is one exception. Specifically, in order to achieve a condition of low recombination velocity in some materials it may be desirable to diffuse or otherwise introduce into one semiconductor surface a very thin layer of doped material slightly more extrinsic than the bulk. This layer creates an L–H junction which has the property of inhibiting the flow of excess carriers into the surface and effectively produces a near zero recombination boundary for the bulk of the material. A device having an L–H junction is more sensitive than one not having such a junction, because the L–H junction creates the desired low recombination velocity surface to form a transducer wherein pinch effect is the predominant factor.

It will be appreciated from the foregoing description that the invention provides a novel semiconductor transducer that combines two effects. These effects are piezoresistance and pinch effect. If desired, the piezoresistance effect can be made dominant. Alternatively, the pinch effect can be made dominant. The piezoresistance effect transducer is not as sensitive as the pinch effect transducer. Between the two extremes are a plurality of devices that can be made more or less sensitive as desired. The devices are easily formed of various semiconductors such as homogeneous germanium or silicon, for example. If desired, an L–H junction can be formed to increase the sensitivity of the transducers. Hence, the invention can take on many forms all of which are not specifically described herein.

What is claimed is:

1. A transverse piezoresistant and pinch effect electromechanical transducer comprising:
    a body of piezoresistive material having a longitudinal force sensing axis and a pair of transverse surfaces parallel to said longitudinal force sensing axis, said longitudinal force sensing axis and said transverse surfaces being skewed with respect to a main crystallographic axis of said body of piezoresistive material;

voltage means connected to said body of piezoresistive material for creating an electric field along said longitudinal force sensing axis; and voltage sensing means connected to said transverse surfaces for sensing a voltage change across said surfaces when force is applied along said longitudinal force sensing axis.

2. A transverse piezoresistant and pinch effect electromechanical transducer as claimed in claim 1 wherein both of said transverse surfaces have large recombination velocities whereby piezoresistance is the predominant effect creating said sensed voltage change.

3. A transverse piezoresistant and pinch effect electromechanical transducer as claimed in claim 2 wherein said body of piezoresistive material is formed of germanium.

4. A transverse piezoresistant and pinch effect electromechanical transducer as claimed in claim 2 wherein said body of piezoresistive material is formed of silicon.

5. A transverse piezoresistant and pinch effect electromechanical transducer as claimed in claim 1 wherein said body of piezoresistive material is formed so that one of the transverse surfaces has an extremely high recombination velocity and the other surface has an extremely low recombination velocity whereby pinch effect is the predominant effect creating the sensed voltage change.

6. A transverse piezoresistance and pinch effect electromechanical transducer as claimed in claim 5 wherein said body of piezoresistive material is formed of germanium.

7. A transverse piezoresistant and pinch effect electromechanical transducer as claimed in claim 5 wherein said body of piezoresistive material is formed of silicon.

8. A transverse piezoresistant and pinch electromechanical transducer as claimed in claim 1 wherein said transverse surfaces are treated to produce high and low recombination velocities, respectively.

9. A transverse piezoresistant and pinch effect electromechanical transducer as claimed in claim 8 wherein said body of piezoresistive material is formed of germanium.

10. A transverse piezoresistant and pinch effect electromechanical transducer as claimed in claim 8 wherein said body of piezoresistive material is formed of silicon.

11. A transverse piezoresistant and pinch effect electromechanical transducer as claimed in claim 1 wherein a very thin layer of doped material is diffused into one of said transverse surfaces to make said transverse surface more highly doped than the bulk of said body of piezoresistive material, thereby creating an L–H junction.

12. A transverse piezoresistant and pinch effect electromechanical transducer as claimed in claim 11 wherein said body of piezoresistive material is formed of germanium.

13. A transverse piezoresistant and pinch effect electromechanical transducer as claimed in claim 11 wherein said body of piezoresistive material is formed of silicon.

References Cited

UNITED STATES PATENTS

| | | | |
|---|---|---|---|
| 2,736,822 | 2/1956 | Dunlap | 307—308 XR |
| 2,869,001 | 1/1959 | Welker | 307—309 |
| 2,979,668 | 4/1961 | Dunlap | 307—309 XR |
| 3,145,563 | 8/1964 | Hollander. | |
| 3,160,762 | 12/1964 | Steele et al. | |
| 3,213,681 | 10/1965 | Pearson | 73—141 |
| 3,251,222 | 5/1966 | Fenner | 73—88.5 |
| 3,396,283 | 8/1968 | Glicksman et al. | 307—308 XR |

CHARLES A. RUEHL, Primary Examiner

U.S. Cl. X.R.

307—308; 317—235